Aug. 25, 1970    D. T. MOZER    3,525,937
MATCHED IMPEDANCE TEST PROBE FIXTURE
Filed Oct. 19, 1967    7 Sheets-Sheet 2

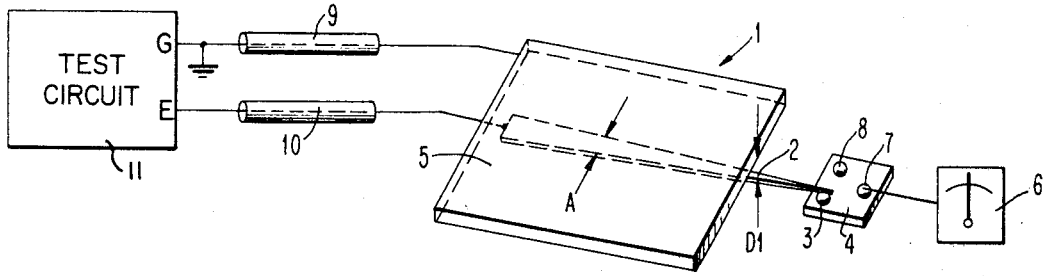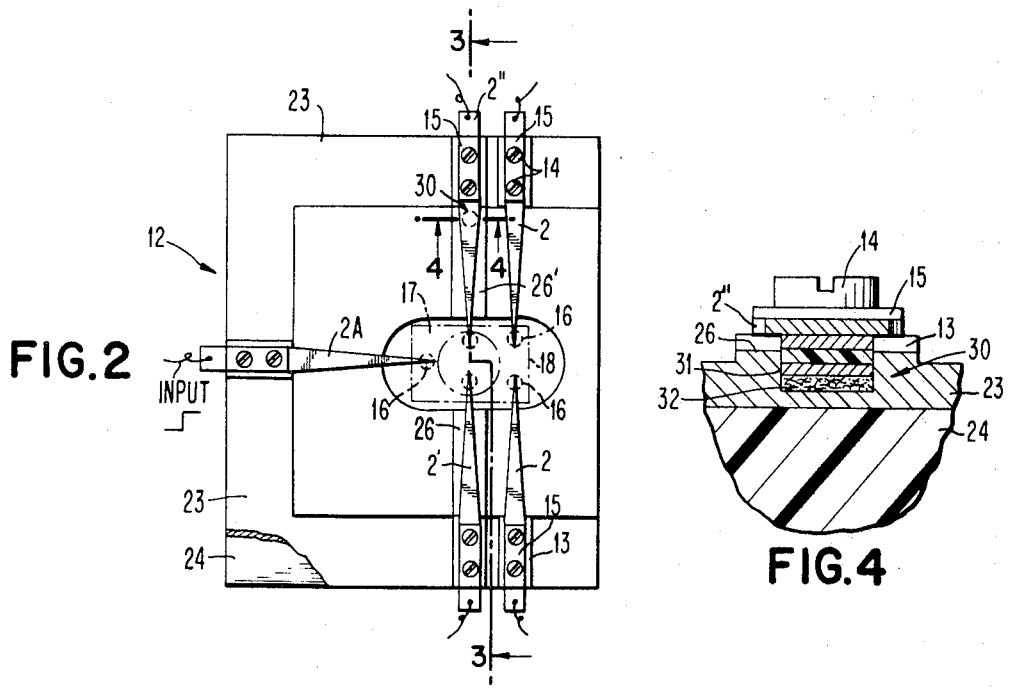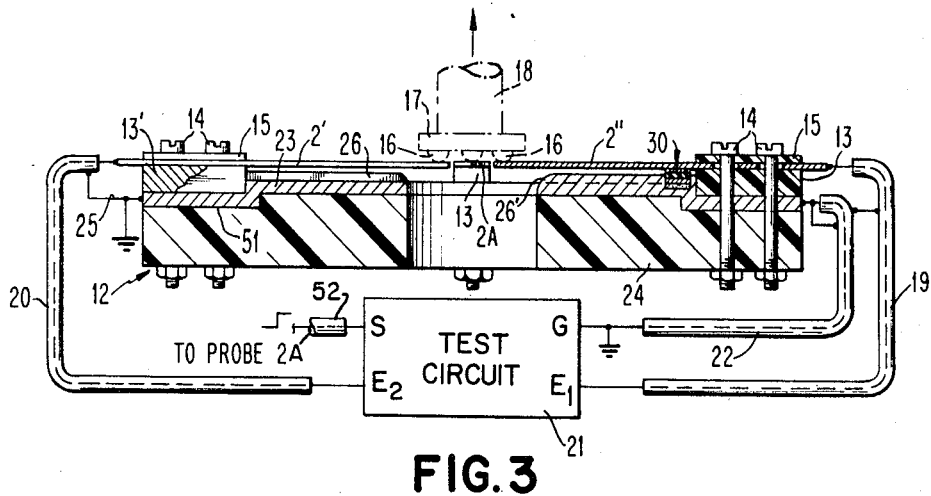

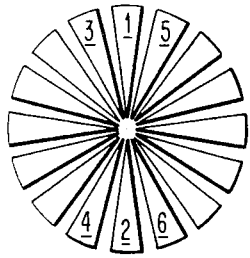
FIG. 7
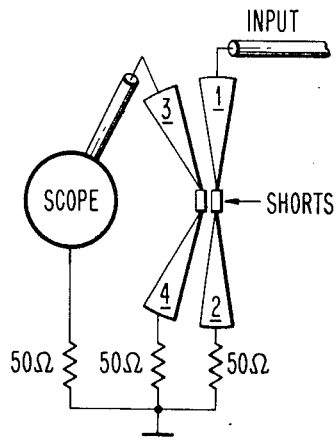
FIG. 7A
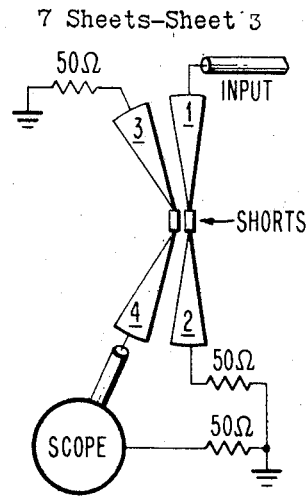
FIG. 7B
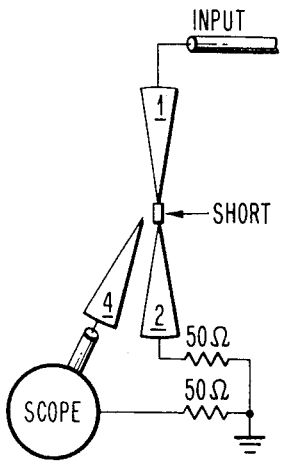
FIG. 7C
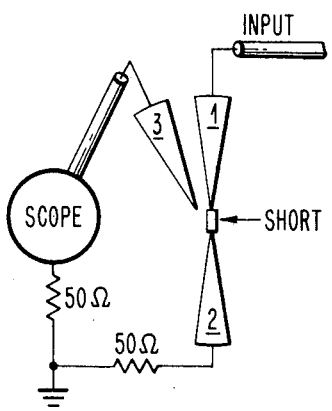
FIG. 7D
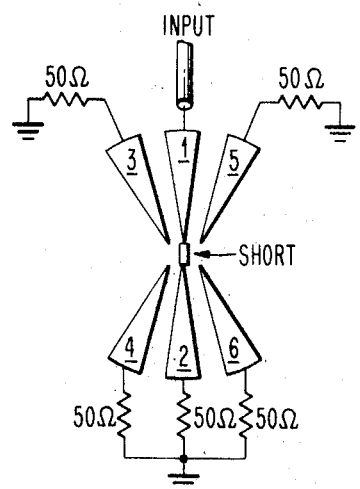
FIG. 7E
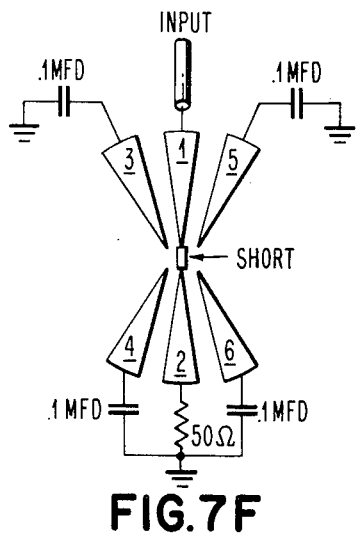
FIG. 7F
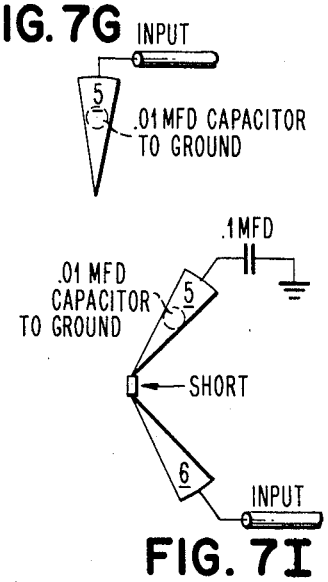
FIG. 7G
FIG. 7I
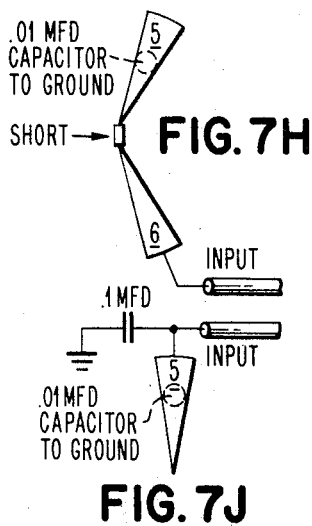
FIG. 7H
FIG. 7J

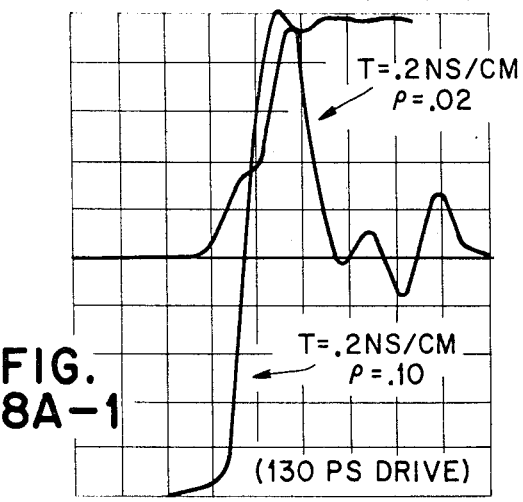
FIG. 8A-1 NEAR CROSS TALK 9.6% (130 PS DRIVE)
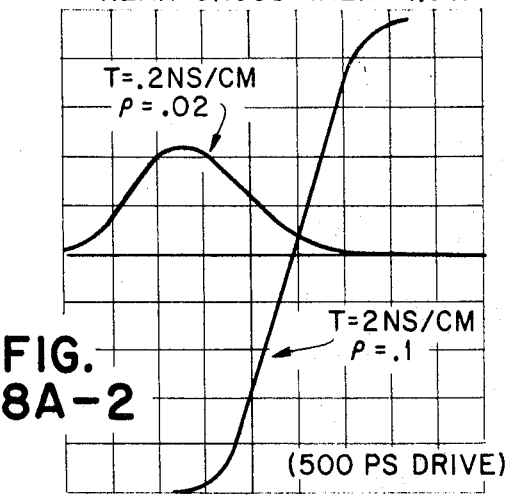
FIG. 8A-2 NEAR CROSS TALK 4.6% (500 PS DRIVE)
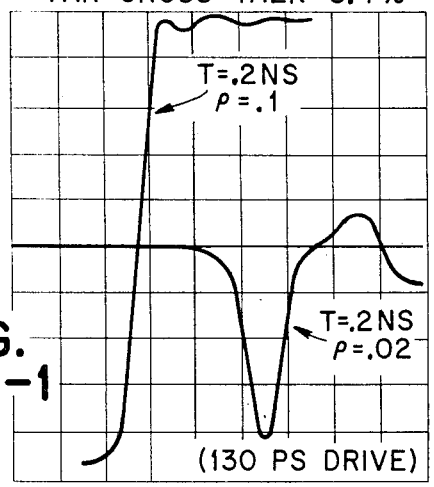
FIG. 8B-1 FAR CROSS TALK 8.4% (130 PS DRIVE)
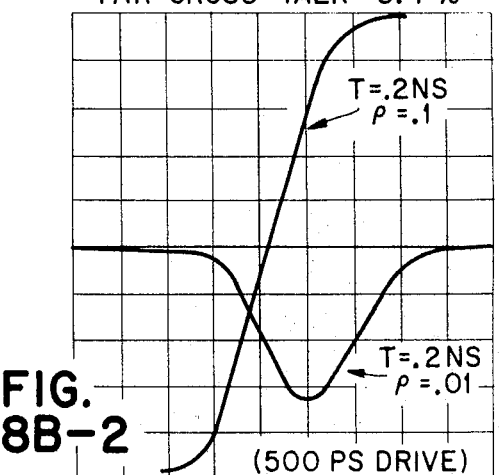
FIG. 8B-2 FAR CROSS TALK 3.4% (500 PS DRIVE)
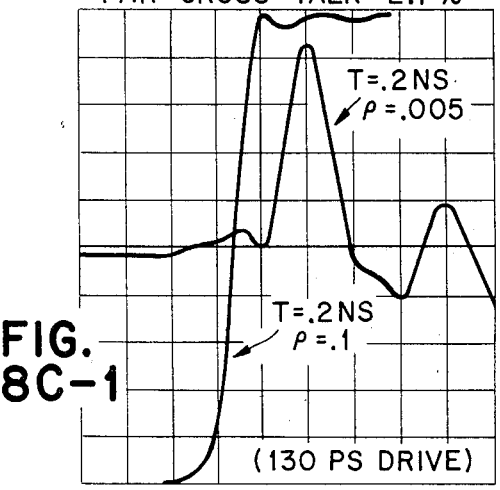
FIG. 8C-1 FAR CROSS TALK 2.1% (130 PS DRIVE)
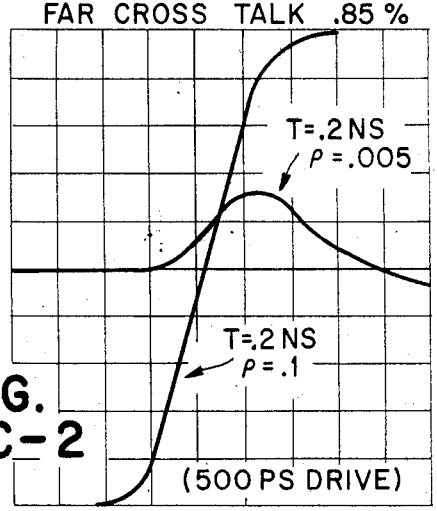
FIG. 8C-2 FAR CROSS TALK .85% (500 PS DRIVE)

United States Patent Office 3,525,937
Patented Aug. 25, 1970

---

3,525,937
MATCHED IMPEDANCE TEST PROBE FIXTURE
Donald Thomas Mozer, Chelsea, N.Y., assignor to International Business Machines Corporation, Armonk, N.Y., a corporation of New York
Filed Oct. 19, 1967, Ser. No. 676,545
Int. Cl. G01r 31/02
U.S. Cl. 324—72.5                                    15 Claims

ABSTRACT OF THE DISCLOSURE

A dynamically matched test probe fixture in which one or more cantilever mounted probes are mounted on a coextending and spaced ground plane which provides a predetermined impedance between itself and each probe.

FIELD OF THE INVENTION

This invention relates to test probes for making temporary connection to electrical devices, circuits and the like, for connection thereof to a test circuit, and more particularly to high performance dynamically matched test probes for testing the response of semiconductor devices, such as monolithic circuits, to signals having rise and/or fall times approaching the subnanosecond region, as for example 1 to 5 nanoseconds.

DESCRIPTION OF THE PRIOR ART

In the manufacturing of semiconductor devices, as for example monolithic circuits, various tests are performed for purpose of control and/or characterization by means of probes which contact exposed terminal or land area connected to the device contained circuits whereby connection can be made therefrom to suitable test circuits. Typical of the probe fixtures conventionally employed for testing of semiconductor devices are those shown and described in U.S. Pats. No. 3,185,929 and No. 3,264,556.

Conventionally, probe structures used heretofore have comprised hardened steel pins mounted on the ends of supporting arms provided with a suitable conductor which is, in turn, connected to a test circuit by shielded transmission lines in order to maximize preservation of high frequency signals. Although such prior art probes perform satisfactorily for DC and AC testing of slow speed semiconductor devices, such probes do not provide the degree of accuracy and sensitivity required for the high speed requirements of the more advanced monolithic circuits, particularly with respect to their high frequency characteristics, since such probes have large inherent electrical discontinuities associated with them (usually inductive) in view of the unshielded conductive portions associated with the holder and probe pin per se.

Heretofore efforts to minimize such discontinuities have resided in attempts to shorten and miniaturize the probe length and/or holder. However, such attempts are inadequate since unshielded conductive portions remain which contribute significantly to reflectance of signals having rise times approaching the subnanosecond region, e.g. 1 to 5 nanoseconds.

SUMMARY OF THE INVENTION

In contrast to the foregoing, a novel probe fixture has been discovered for testing of high performance semiconductor devices, including monolithic circuits, by which the integrity of fast rise test pulses to the device, can be preserved with substantial elimination of pulse reflections. In its broadest concept, the invention comprehends the use of one or more extended probes (normally of the order of .35 inch in length) in conjunction with and spaced from a grounding plane which coextends with the probe. Preferably, the probe fixture is provided with a predetermined impedance which is matched to the output impedance of a test circuit, which in turn, in accordance with conventional practice, is designed to have an output impedance (from which the test signal emanates) commensurate with the environment in which the output impedance of the semiconductor device is to normally operate.

The impedance of the probe fixture is matched to the output of the test circuit by appropriate spacing between the probe and ground plane essentially in accordance with the equation $$Z_0 = \sqrt{L/C}$$

where $Z_0$ is the output impedance of the test circuit, and L and C are, respectively, the inductance and capacitance as a function of the extension and spacing of the probe relative to the ground plane.

Accordingly, it is an object of this invention to provide a novel probe fixture for high performance testing of electrical devices or elements.

It is another object to provide a novel probe structure for contact connection to an electrical device for connection thereof to a test circuit.

It is further an object to provide a novel probe fixture for contact connection to electrical devices wherein the impedance of the probe fixture can be matched to the output impedance of a test signal genertering source.

A still further object of this invention is to provide a novel probe fixture for testing of high performance semiconductor devices by fast rise test signals from a test circuit wherein the integrity of the signal can be preserved with substantial minimization of signal reflection.

The foregoing and other objects, features and advantages of the invention will be apparent from the following more particular description of the preferred embodiments of the invention as illustrated in the accompanying drawings.

BRIEF DESCRIPTION OF THE DRAWINGS

FIG. 1 is a perspective view of one embodiment incorporating the features of this invention as applied to a single probe fixture.

FIG. 2 is a plan view of another embodiment of this invention as applied to a multiple probe fixture.

FIG. 3 is a cross-sectional view taken along lines 3—3 of FIG. 2, and shown in contact connection with the terminals of a semiconductor device to be tested.

FIG. 4 is a fragmentary cross-sectional view taken along line 4—4 of FIG. 3 for purposes of clarifying a modification of this invention.

FIGS. 7 to 7J are diagrammatic representations of various configuration employed in evaluating the probe fixture of FIG. 5.

FIGS. 8A to 8J-2 are oscillograms obtained in the evaluation of the configurations of FIGS. 7A to 7J.

DESCRIPTION OF THE PREFERRED EMBODIMENTS

Figures 1, 8D:
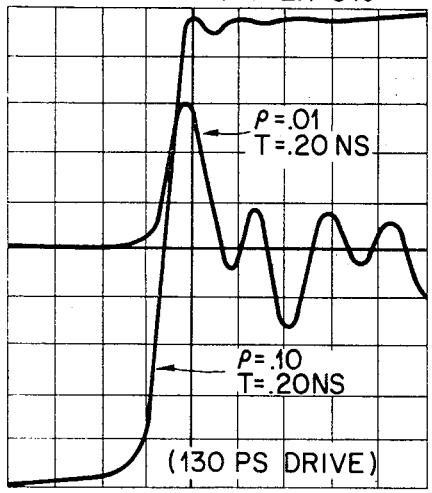

In the embodiment of this invention referring to the drawings, shown in FIG. 1 is single probe fixture 1 comprised of a single leaf spring probe 2, of sheet stock of about .007 inch, in contact connection with a ball terminal 3 of a semiconductor device 4. Coextending with probe blade 2 is the ground plane 5 of suitable conductor material such as a sheet of copper-beryllium stock, which alloy may also comprise the composition of the spring stock of probe blade 2. Shown for purposes of illustration is a suitable measuring device 6 connected to a ball terminal 7 of the semiconductor device 4, with the connection of the measuring device 6 being effected in any suitable manner, but preferably with a similar probe fixture of this invention. As will be understood, ball contact 8 of semiconductor device 4 may also be suitably biased by means not shown. For purposes of effecting testing of semiconductor device 4, ground plane 5 and the probe blade 2 are suitably interconnected by shielded transmission lines 9 and 10 to, respectively, a ground and reference voltage terminals of a test circuit 11 providing suitable pulses or high frequency signals having rise times which may approach into the subnanosecond range, e.g. of the order of 1 to 4 nanoseconds.

Preferably test circuit 11 will be characterized by an output impedance corresponding to the environment in which the input impedance of semiconductor device 4 operates. Correlation of the ground plane 5 with the probe blade 2, in accordance with this invention, enables the preservation of the integrity of the test pulses from test circuit 11 and substantially minimizes reflection by appropriate matching of the impedance of the probe fixture to the output impedance of test circuit 11. This is accomplished by correlating the coextension and spacing of the test probe 2 relative to ground plane 5 essentially in accordance with the equation $Z_o = \sqrt{L/C}$ where $Z_o$ is the output impedance of test circuit 11 and L and C are, respectively, the inductance and capacitance as a function of the coextension and spacing of probe 2 relative to ground plane 5. With the length and configuration of probe blades 2 fixed for measurement of a series of semiconductor devices having standardized physical dimensions, the inductance in turn becomes fixed, to require only the adjustment of the spacing between probe blade 2 and ground plane 5 for purposes of matching the impedance of the probe fixture to the output impedance of test circuit 11, in accordance with standard equations for derivation of impedances of a capacitor where $$E_c = f\left(\frac{1}{2 \text{ pi } f \frac{A}{D_1}}\right)$$

which is simplified to $$E_c = f\left(\frac{D_1}{2 \text{ pi } fA}\right)$$

wherein A represents the area of the ground plane 5 superposed by the cross-section of probe blade 2, and $D_1$ represents the spacing between probe blade 2 and ground plane 5. Thus, as will be apparent, with the cross-section of probe blade 2 fixed, "A" becomes a constant, and the capacitance between probe blade 2 and ground plane 5 can be simply increased or decreased by mere adjustment of the spacing therebetween. Conversely, the capacitance of the elements may be selected (by appropriate spacing therebetween) to the desired value, which in conjunction with the frequency of the test pulse employed, provides the desired impedance of the test fixture, which in the instant embodiment, will correspond to the output impedance of test circuit 11. Thus it will be noted, for purposes of simplification, the cross-sectional dimensions of probe 2 were fixed in order to provide a single variable reflecting the spacing between the elements.

It is to be understood, that although the testing of a semiconductor device 4 has been referred to above, the test fixture of this invention is equally applicable for the measurement of other electrical circuits and elements. A typical semiconductor device comprehended in the foregoing is that illustrated and discussed on pages 96 and 97 of the IBM Technical Disclosure Bulletin, vol. 10, No. 1, June 1967. Further, although a simple device is here employed for purposes of simplicity, the test fixture of this invention is specifically contemplated for use in the more complex high performance monolithic circuit devices.

Figures 2, 8D:
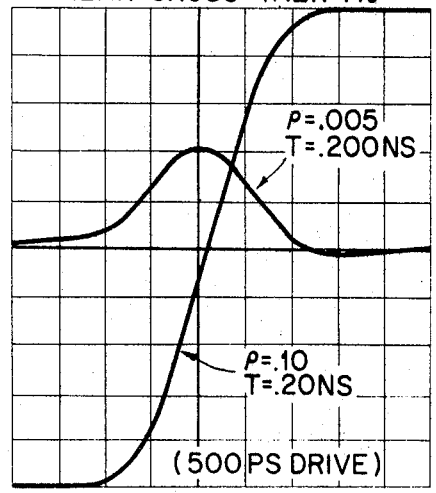
Figures 1, 8E:
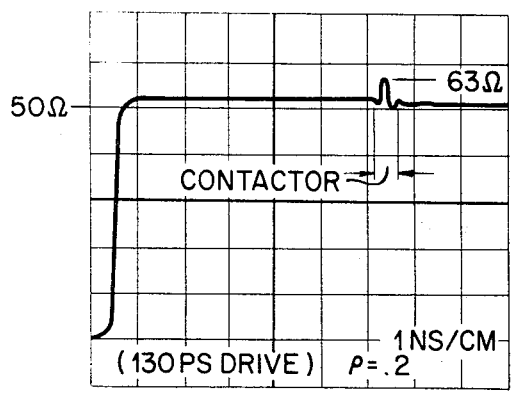
Figures 2, 8E:
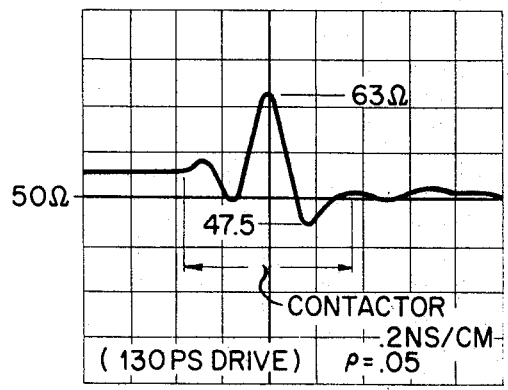
Figures 3, 8E:
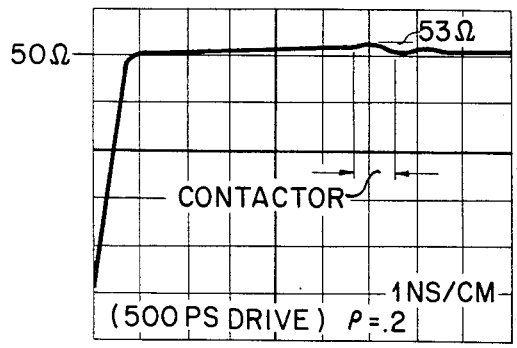
Figures 4, 8E:
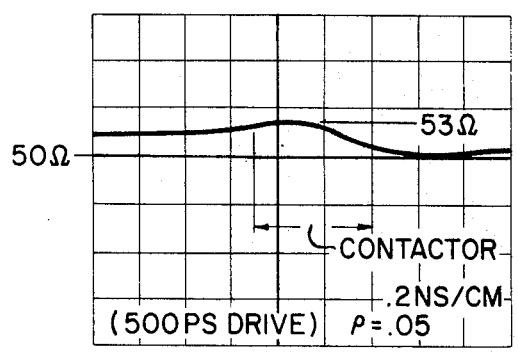
Figures 1, 8F:
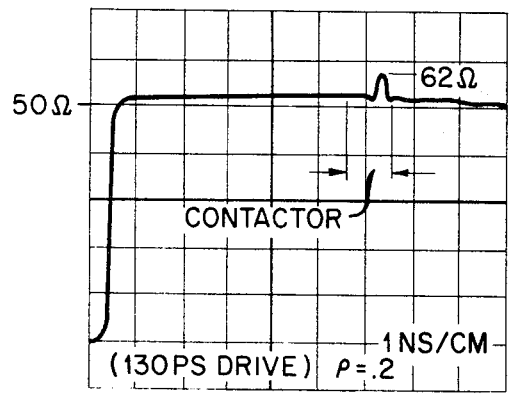
Figures 2, 8F:
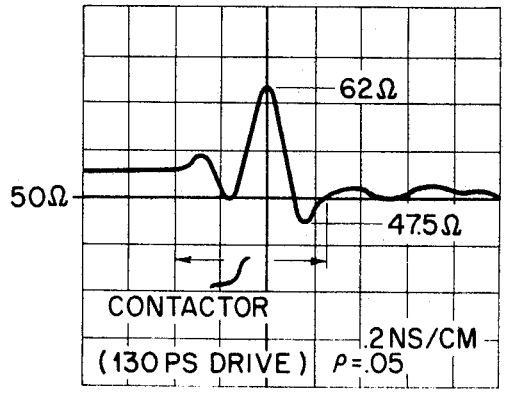
Figures 3, 8F:
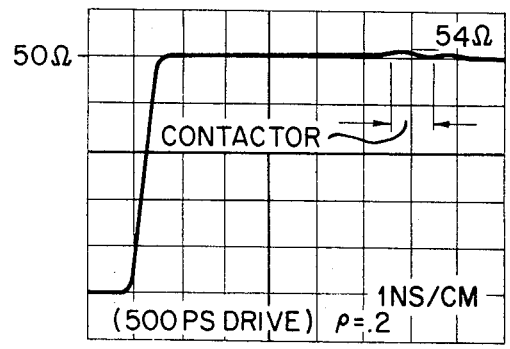
Figures 4, 8F:
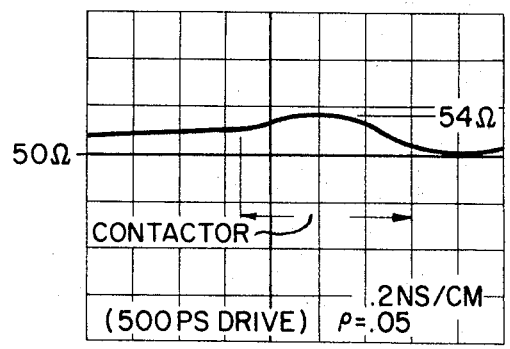
Figures 1, 8G:
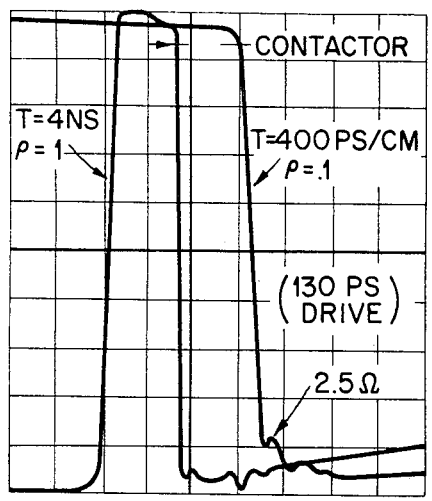
Figures 2, 8G:
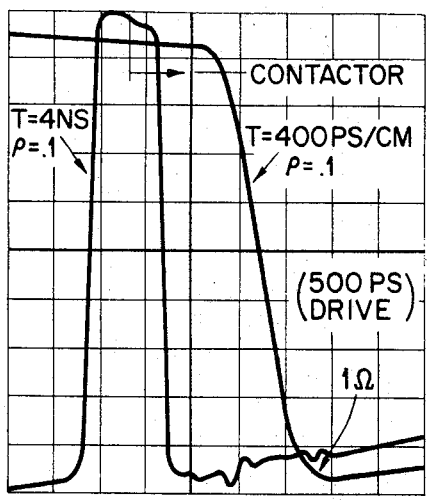
Figures 1, 8H:
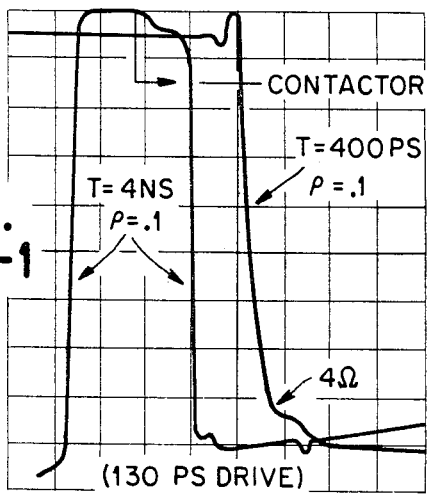
Figures 2, 8H:
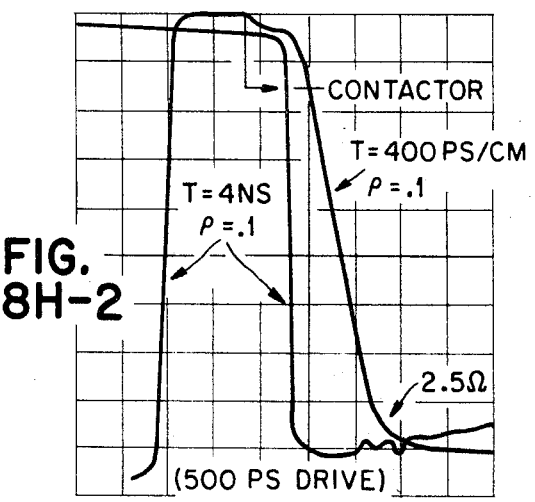
Figures 1, 8I:
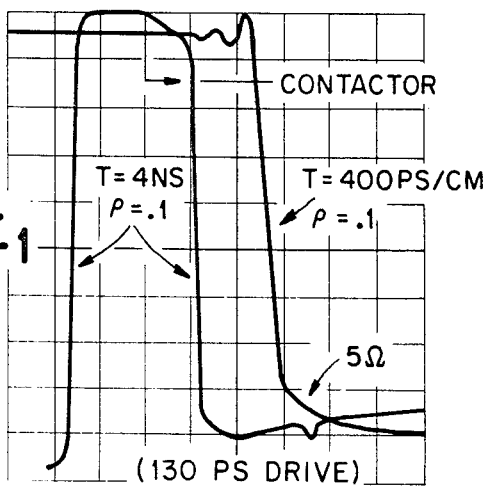
Figures 2, 8I:
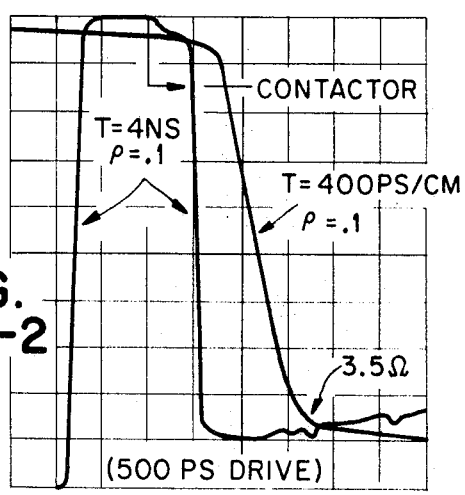
Figures 1, 8J:
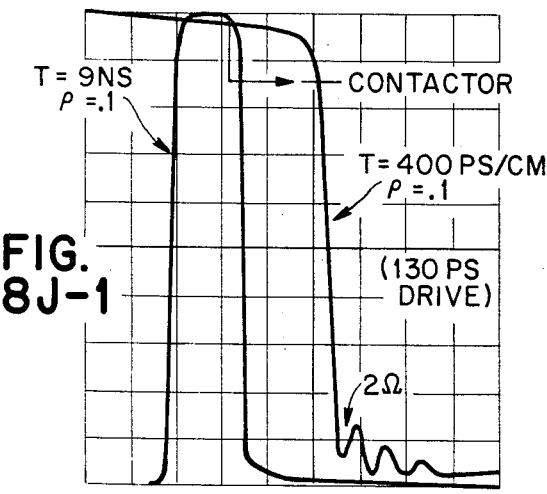
Figures 2, 8J:
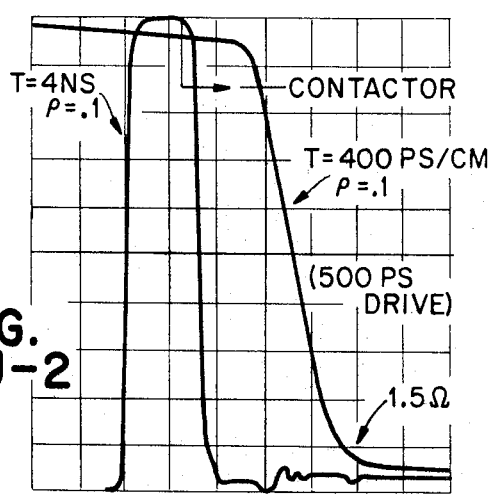

In the embodiment of FIGS. 2 to 4, a multi-probe blade structure is shown mounted in cantilever configuration in a peripheral recess 51 of a ground plane assembly 12 by means of an insulated standoff 13 and suitable fasteners 14, as for example a nut and bolt assembly, suitably isolating probe blades 2 between standoffs 13 and cover plates 15. Probe blades 2 may be fabricated of suitably conductive spring-flat stock, such as copper-beryllium alloy and the like, provided with a tapered converging configuration which defines cantilever beams by which nearly equal forces can be maintained on each of many device contracts, such as ball terminals 16 of an integrated circuit chip 17. As shown, chip 17 may be suitably positioned on probe blades 2 with pre-orientation thereof on a vacuum holder 18. As in the previous assembly, appropriate probe blades may be connected as shown, by corresponding shielded transmission lines 19 and 20 to the respective source voltages $E_1$ and $E_2$ of a test circuit 21; and conversely the ground plane connected to the ground terminal of test circuit 21 by shielded transmission line 20, with probe blade 2A connected to a signal terminal S of test circuit 21 by transmission line 52.

Although probe blades 2 are shown mounted on the ground plane assembly 12 it is to be understood that other suitable mounting of the probe blades may be employed, as for example, mounting of the probes to an external support, e.g. an overhead support which suspends the probes in the desired relationship with the ground plane. Preferably the probe blades are of flat or sheet stock whereby their planar extension may be disposed in coextending relationship with the ground plane.

The ground plane assembly 12 of this embodiment comprises a suitable conductive coating 23 of a conductive material, such as copper, deposited on an elecrtically insulating substrate 24 by any conventional manner, such as metallization and the like.

Also included in the instant embodiment is provision for the grounding of a test probe 2' to the grounding plane, illustrated here for simplicity, by a short 25; however, it is to be understood that suitable grounding of probe 2' to ground plane may be effected by electrical connection therebetween with the fasteners 14 or by use of a conductive standoff 13'. Also, in order to minimize apparent ground loop impedance in such a modification, a ridge or stepped portion 26 is provided on the ground plane under the grounded probe blade 2' in order to increase the capacitance therebetween. Further, in order to decouple a voltage connection to a probe for stabilization thereof, a capacitor 30 is included between probe blade 2" and electrical coating 23 of the ground plane assembly 12 also provided with a stepped or ridge portion 26'. Deflection of the cantilever probe blade 2" accommodated by mounting capacitor 30 in a recess 31 (in ground plane assembly 12) into which was previously inserted a "fuzz ball" 32 comprising shredded conductive material, such as copper, and the like.

Figure 6:
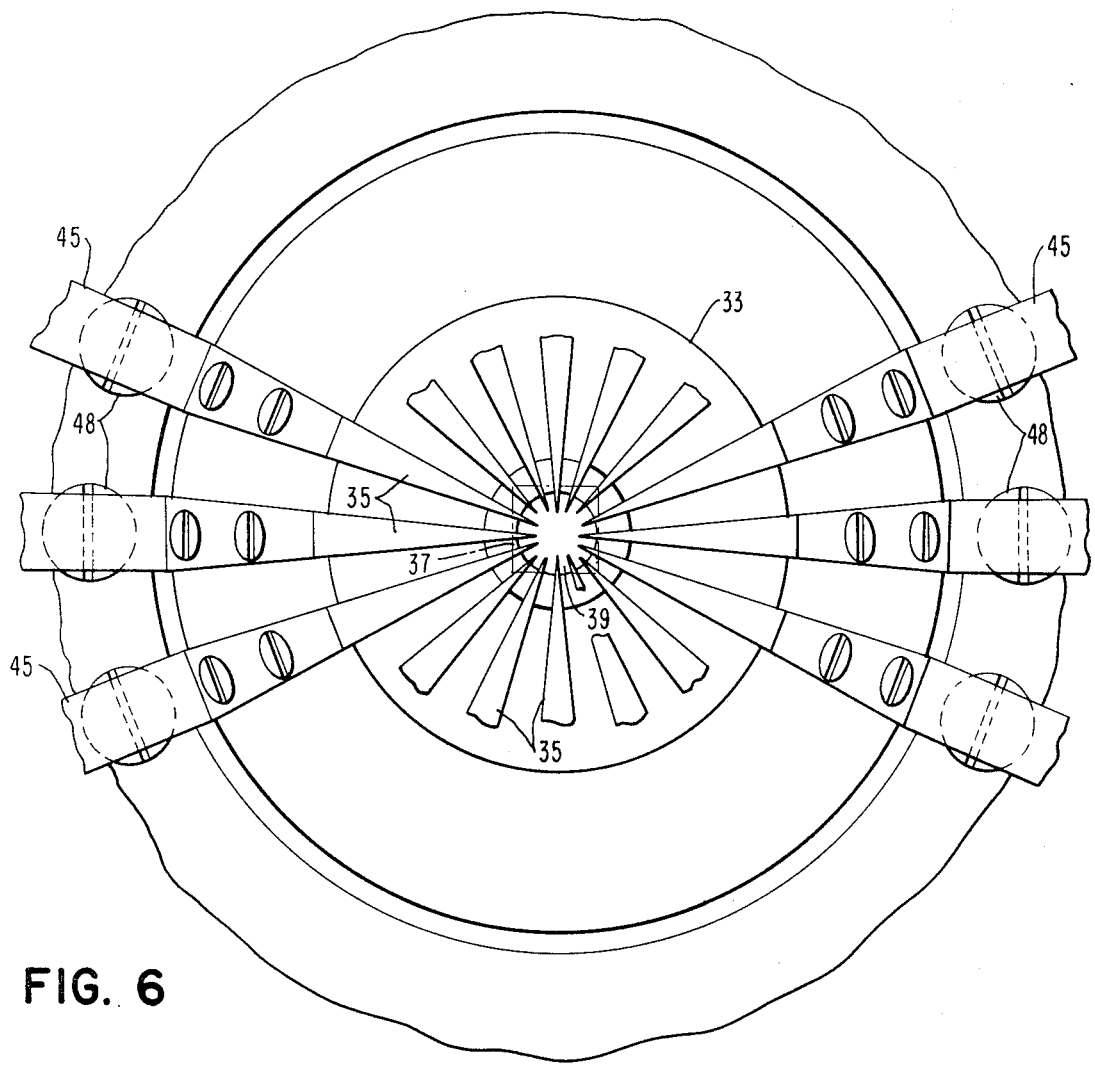
FIGS. 5 and 6 are respectively, a sectional elevational view and a plan view of another embodiment of this invention as applied to a 16 probe fixture for contact connection to a corresponding number of ball terminals of a monolithic circuit device.
Figure 5:
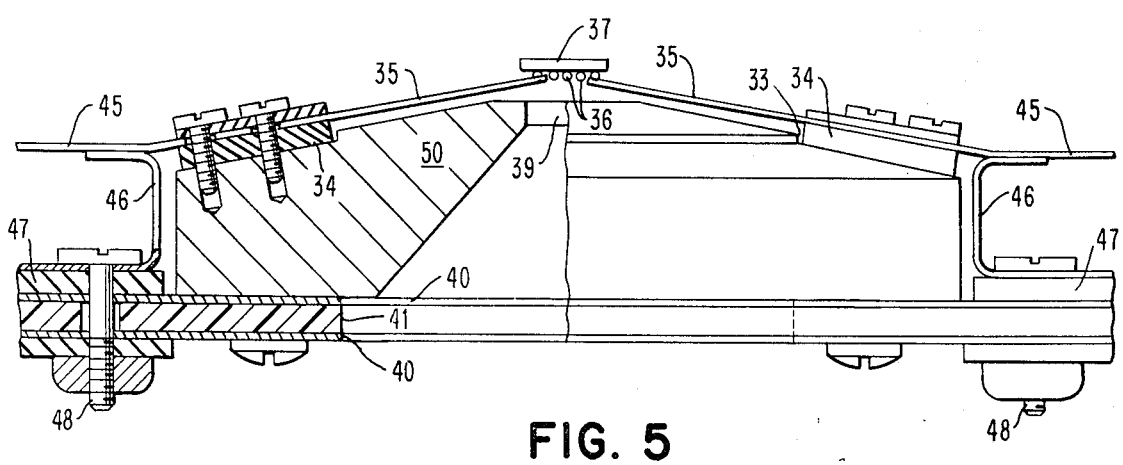

In the embodiment illustrated in FIGS. 5 and 6, the ground plane 50 is fabricated of suitable conductive material, such as copper, and provided on the upper surface thereof with a truncated conical configuration and an annular recess 33 around the peripheral portions thereof to define the seat for mounting of insulating standoffs 34. Normally the conical configuration will be developed 0 to 90° and preferably 0 to 15°, with the specific embodiment constituting 5°. In turn, mounted on standoffs 34 are 16 leaf-spring probe blades 35 which extend radially inwardly and are inclined upwardly, in cantilever fashion, for contact with the ball terminals 36 of a microcircuit chip 37 which is disposed over a viewing hole or aperture 39 through which appropriate observation may be made for presetting of the probe blade tips into the required contact registration with the ball terminals 36 of chip 37.

A specific example of a non-ground end embodiment (use for below noted evaluation) a ground plane of brass included a shallow conical configuration of 10° which was developed from a base diameter of 1.2 inches. The leaf-spring stock of probe blades 35 was .007 inch thick with maximum width of .1 inch immediately adjacent the cantilever mounting, with convergence to about .0025 in Rod probe tip over a probe length of .35 inch. The spacing between the probes and ground planes was .016 in., and the probe mounting standoffs 34 were fabricated from polycarbonate thermoplastic stock.

Ground plane 50 is mounted on a conductive coating 40 of a support 41 similarly coated on the opposite face thereof with a conductive layer 42 in order to facilitate external circuit connection and grounding of desired probe blades 35.

In addition probe blades 35 include rearwardly extending projection 45 abutted by spring metal pressure contacts 46 suitably secured to support 41 via insulating standoffs 47 by fasteners 48 which also serve as terminals for external connection to appropriate test circuits.

It is noted that in operation, as the chip is brought into contact with the probe blades each probe blade is deflected (i.e. the capacitance to ground changes with gap), a certain distance. However, while the actual impedance change may be quite significant ($\pm 15$ ohms) for such defection, the time duration of the discontinuity is in the neighborhood of 15–25 picoseconds, which, in the testing environments contemplated, means that a signal with a rise time of 1 nanosecond will "see" virtually no discontinuity, as will be more apparent from the following evaluation of a probe fixture fabricated in accordance with this invention.

A series of tests were made on a leaf-spring test fixture, of this invention, for evaluation thereof in the testing of high speed logic circuits in which sub-nanosecond switching times are incurred. As will be apparent, it is very important, in the sub-nanosecond range to have good terminations and a consistency of impedance in the AC wiring.

A probe fixture employed, as indicated above for the evaluation constituted 16 leaf-spring probe blades for contact with 16 different points in an area of 20 by 60 mils and various tests were made to determine the stability of the probe fixture to maintain a characteristic impedance of 50 ohms. Various tests were then made to determine the qualification of the contactor for inductance, capacitance, cross-talk, impedance and effectiveness of a .01 mfd. capacitor in the voltage leaves. FIG. 7 gives a general layout of the contactor arrangement employed in the test. All tests conducted will be referenced to the number of the leave(s) under test. Any leaf not mentioned was left floating. A short piece of copper, measuring .8 milhenries, was used to connect the leaves in series, if needed. This was done with a 5 mil downward movement as the initial contact was made to the copper strip. Inductive measurement was made on a Booton bridge at a frequency of 400 kc. A piece of Rg 58 A/U of known inductance was connected to leaf 1 and a short was probed to connected leaf 1 to leaf 2. The output of leaf 2 was grounded.

The capacitance measurements were made on the Booton Capacitive Bridge at a frequency of 1 meg. cycles. Measurement of leaf 1 to ground, and leaf 1 in a series with 2 to ground were made in a grounded mode. All coupling measurements between adjacent leaves were made in a direct mode.

The cross-talk and impedance measurements were made on a Hewlett Packard 1415A Time Domain Reflectometer, (e.g. HP 1415A TDR). Measurements were made at 130 picoseconds (10–90%) rise times. A 500 picosecond rise time integrator was used for measurement at 500 ps. (10–90%). The amplitude of the pulses were 250 mv. (0–100%). In the cross-talk measurements, the output amplitude was measured in comparison to the input and an input to an output percentage was made. There were 4 different setups made with two types of cross-talk, near-end and far-end. Near-end being where the percentage is taken at the same end as the input; far-end being the end away from the input. The setups for these tests are shown in FIGS. 7A to 7D. Of particular interest is the configurations shown in FIG. 7A where there is a negative amplitude on leaf 3 as cross-talk, with a positive amplitude, see FIGS. 8A–1 to 8D–2. This is attributed to inductive coupling.

Impedance measurements were made on the HP 1415 TDR with the same rise time as the cross-talk measurements. These measurements were made to various leaf configurations as shown in FIGS. 7E and 7F to study the effects of having different terminations on adjacent leaves. No appreciable impedance was noted on leaf 1 in series with leaf 2 wherein the adjacent leaves were terminated in 50 ohms or AC shorted.

The main area of discontinuity came where the leaves made contact with the chip see FIGS. 8E–1 to 8E–4 and 8F–1 to 8F–4. This is attributed to the absence of a ground plane in this area. The ground plane was removed to accommodate a microscope used during probing.

The effectiveness of a .01 mfd. capacitor and the voltage leaves was measured by the HP 1415A TDR with the setups shown in FIGS. 7G to 7J. The measurements in this test were taken from an Out-of Phase reflections. The 500 ps. RT pulse was measured at 1 nanosecond after the 10% point. A 130 ps. RT pulse was measured at 50 ps. after the 10% point. See FIGS. 8G–1 to 8J–2.

All the foregoing measurements represent AC surge resistance, with the results of the tests shown in the corresponding graphs of FIGS. 8A–1 to 8J–2 wherein 8A corresponds to the corresponding tests of configuration of FIG. 7A; 8B corresponds to the configurations and measurements of FIGS. 7B, 8C corresponds to the measurements made on the configurations of 7C and so forth.

FIGS. 8A–1 to 8J–2 illustrate tracing of actual oscillograms of the test indicated and vividly depict the results obtained, with a summary given in the tabulation below. Of particular interest, as indicated and shown on the graphs, is that significant discontinuities, occur at the interface of the probe with the contactor.

Inductance per leaf—6.05 nh.
Cap. from one leaf to ground—3.37 pf.
Cap. of one leaf in series with another to ground—6.2 pf.
Cap. between two adjacent leaves—.115 pf.
Cap. between two pairs parallel leaves in series—.248 pf.

| Figure configuration | RT pulse | |
|---|---|---|
| | 130 ps. | 500 ps. |
| Crosstalk (percent): | | |
| 7A | 9.6 | 4.6 |
| 7B | 8.4 | 3.4 |
| 7C | 2.1 | .85 |
| 7D | 3.0 | 1.0 |
| Impedance (ohm): | | |
| 7E | 47.5–63 | 50–53 |
| 7F | 47.5–62 | 50–54 |
| Surge resistance (ohm): | | |
| 7G | 2 | 1 |
| 7H | 4 | 2 |
| 7I | 4.5 | 2.5 |
| 7J | 1.5 | 1 |

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A high performance test fixture for contact connection to terminals of an electrical element for electrical connection thereof to a test circuit having an output impedance corresponding to the environment in which said element operates comprising:
(A) a support comprising
  (a) an electrically conductive ground plane adapted for connection to said test circuit and having the top surface thereof characterized by a truncated conical configuration, and
  (b) an annular recess adjacent the peripheral edges of said ground plane;
(B) a plurality of upwardly inclined leaf spring planar probe blades concentrically disposed about a circle with
  (a) said blades extending inwardly, and having
    (i) the test ends disposed over the truncated portion of said ground plate for contact connection to said terminals, and
    (ii) having the other ends adapted for connection to said test circuit, and
  (b) said blades coextending with said ground plane in spaced relationship therewith, at least one of said blades being related to said ground plane essentially in accordance with equation $Z_0=\sqrt{L/C}$ where $Z_0$ is said output impedance of said test circuit, and L and C are, respectively, the inductance and capacitance as a function of the coextension and spacing of said blade relative to said ground plane; and
(C) insulated standoffs for cantilever mounting of said blades adjacent their said other ends about said annular recess.

2. The test fixture of claim 1 including means for minimizing ground loop impedances when a terminal of said element is connected to ground comprising means for shorting one of said probes to said ground plane.

3. The test fixture of claim 1 including means for minimizing ground loop impedances when a terminal of said element is connected to ground comprising:
(A) means for shorting one of said probes to said ground plane; and
(B) a ridge in said ground plane beneath and coextending with said one probe with said ridge adapted to reduce the spacing therealong between said ground plane and said one probe whereby capacitance is increased between said one probe and said ground plane when said element is connected to said test circuit.

4. The test fixture of claim 1 including a capacitor connected between said ground plane and one of probes adapted for decoupling a voltage applied to said one probe.

5. A high performance dynamically matched test fixture for contact connection to the terminal of a semiconductor device for electrical connection thereof to a test circuit characterized with an output impedance corresponding to the environment in which said device is to normally operate, comprising:
(A) an extended test probe adapted for connection at one end to said device and at the other end to said test circuit;
(B) a ground plane adapted for connection to said test circuit with said ground plane coextending with and spaced from said test probe essentially in accordance with the equation $$Z_0=\sqrt{L/C}$$

where $Z_0$ is said impedance of said test circuit, and L and C are, respectively, the inductance and capacitance as a function of the coextension and spacing of said probe relative to said ground plane; and
(C) insulating mounting means for cantilever mounting at said other end to said ground plane in said spaced relationship therebetween, with the cantilevered portion of said probe disposed adjacent said ground plane.

6. A high performance dynamically matched test fixture for contact connection to the terminals of a semiconductor device for electrical connection thereof to a test circuit characterized with an output impedance corresponding to the environment in which said device operates, comprising:
(A) at least two extended and spaced probes adapted for connection at one end to said test circuit and having their other end disposed and adapted for contact connection to said terminals of said device for connection thereof to said test circuit;
(B) an electrically conductive ground plane adapted for connection to said test circuit and coextending with and spaced from at least one of said test probes essentially in accordance with the equation $$Z_0=\sqrt{L/C}$$

where $Z_0$ is the impedance of said test circuit and L and C are, respectively, the inductance and capacitance as a function of the coextension of at least one of said test probes relative to said ground plane; and
(C) insulating mounting means for cantilever mounting of said one end of said probes to said ground plane in said spaced relationship therebetween with the cantilevered portions of said probe disposed adjacent said ground plane.

7. The test fixture of claim 6 including means for minimizing ground loop impedances when a terminal of said element is connected to ground, comprising means for shorting one of said probes to said ground plane.

8. The test fixture of claim 6 including means for minimizing ground loop impedances when a terminal of said element is connected to ground, comprising:
(A) means for shorting one of said probes to said ground plane;
(B) a ridge in said ground plane beneath and coextending with said one probe with said ridge adapted to reduce the spacing therealong between said ground plane and said one probe whereby capacitance is increased between said one probe and said ground plane when said element is connected to said test circuit.

9. The test fixture of claim 6 including a capacitor connected between said ground plane and one of said probes adapted for decoupling a voltage applied to said one probe.

10. A high performance dynamically matched test fixture for contact connection to the terminals of a semiconductor device for electrical connection thereof to a test circuit characterized with an output impedance corresponding to the environment in which said device is to normally operate, comprising:
(A) a support comprising
  (a) an electrically conductive ground plane adapted for connection to said test circuit and having the top surface thereof characterized by a truncated conical configuration, and
  (b) an annular recess adjacent the peripheral edges of said ground plane;
(B) a plurality of upwardly inclined leaf spring planar probe blades concentrically disposed about a circle with
  (a) said blades extending inwardly with
    (i) the test ends disposed over the truncated portion of said ground plate for contact connection to said terminals, and
    (ii) having the other ends adapted for connection to said test circuit and
  (b) said blades coextending with said ground plane essentially in accordance with the equation $$Z_0=\sqrt{L/C}$$

where $Z_0$ is the said output impedance of said test circuit, and L and C are, respectively, the inductance and capacitance as functions of the coextension of said probe blades relative to said ground plane; and (c) insulating standoffs for cantilever mounting of said blades adjacent their said other ends about and to said annular recess.

11. The test fixture of claim 10 including means for minimizing ground loop impedances when a terminal of said element is connected to ground, comprising means for shorting one of said probes to said ground plane.

12. The test fixture of claim 10 including means for minimizing ground loop impedances when a terminal of said element is connected to ground, comprising:
   (A) means for shorting one of said probes to said ground plane; and
   (B) a ridge in said ground plane beneath and coextending with said one probe with said ridge adapted to reduce the spacing therealong between said ground plane and said one probe whereby capacitance is increased between said one probe and said ground plane when said element is connected to said test circuit.

13. The test fixture of claim 10 including a capacitor connected between said ground plane and one of said probes adapted for decoupling a voltage applied to said one probe.

14. The test fixture of claim 10 wherein said ground plane comprises a conductive coating on an insulating base.

15. A test fixture for contact connection to terminals of electrical element for electrical connection thereof to a test circuit having an output impedance corresponding to the environment in which said element operates comprising:
   (A) a support comprising a conductive ground plane adapted for connection to said test circuit;
   (B) a plurality of leaf spring planar probe blades peripherally disposed about said support with
      (a) said blades extending inwardly of said ground plane and having
         (i) the test ends disposed over a common test contact area of said ground plane for contact connection to said terminals; and
         (ii) having the other ends adapted for connection to said test circuit, and
      (b) said blades coextending with said ground plane in spaced and parallel relationship therewith, at least one of said blades being related to said ground plane essentially in accordance with the equation $Z_o = \sqrt{L/C}$ where $Z_o$ is said output impedance of said test circuit, and L and C are, respectively, the inductance and capacitance as a function of the coextension and spacing of said blade relative to said ground plane; and
   (C) insulated standoffs for cantilever mounting of said blades adjacent the said other ends
      (a) in said peripheral orientation about said support, and
      (b) in said spaced relationship therebetween, with the cantilevered portion of said probes disposed adjacent said ground plane.

References Cited

UNITED STATES PATENTS

| | | | |
|---|---|---|---|
| 3,155,881 | 11/1964 | Jean. | |
| 3,201,722 | 8/1965 | May | 333—84 |
| 3,347,147 | 11/1967 | Erath | 324—158 |
| 3,381,221 | 4/1968 | Scholer | 324—158 |

RUDOLPH V. ROLINEC, Primary Examiner

E. L. STOLARUN, Assistant Examiner

U.S. Cl. X.R.

324—58; 333—34, 84